US010389768B2

(12) United States Patent
Kleiner et al.

(10) Patent No.: US 10,389,768 B2
(45) Date of Patent: Aug. 20, 2019

(54) METHOD AND DEVICE FOR MANAGING A CONFERENCE

(71) Applicant: Unify GmbH & Co. KG, Munich (DE)

(72) Inventors: Patrick Kleiner, Munich (DE); Karl Klug, Miesbach (DE)

(73) Assignee: Unify GmbH & Co. KG, Munich (DE)

( * ) Notice: Subject to any disclaimer, the term of this patent is extended or adjusted under 35 U.S.C. 154(b) by 758 days.

(21) Appl. No.: 14/662,390

(22) Filed: Mar. 19, 2015

(65) Prior Publication Data

US 2015/0271220 A1  Sep. 24, 2015

(30) Foreign Application Priority Data

Mar. 20, 2014  (DE) .................. 10 2014 004 068

(51) Int. Cl.
| H04L 29/06 | (2006.01) |
| H04L 29/08 | (2006.01) |
| G06Q 50/00 | (2012.01) |
| G06Q 10/10 | (2012.01) |
| H04L 12/18 | (2006.01) |

(52) U.S. Cl.
CPC ......... H04L 65/403 (2013.01); G06Q 10/101 (2013.01); G06Q 50/01 (2013.01); H04L 12/1822 (2013.01); H04L 65/4038 (2013.01); H04L 67/10 (2013.01)

(58) Field of Classification Search
CPC .... H04L 65/403; H04L 12/1822; G06Q 50/01
USPC ........................................... 709/204
See application file for complete search history.

(56) References Cited

U.S. PATENT DOCUMENTS

| 2008/0198141 | A1 | 8/2008 | Lee et al. |
| 2010/0241971 | A1 | 9/2010 | Zuber |
| 2011/0270921 | A1 | 11/2011 | Jones et al. |

(Continued)

FOREIGN PATENT DOCUMENTS

| CN | 1694527 A | 11/2005 |
| CN | 103329152 A | 9/2013 |

OTHER PUBLICATIONS

"Social Network Reduction Based on Stability", Kudelka et al., 2010, Internation Conference on Computational Aspects of Social Networks.*

*Primary Examiner* — Douglas B Blair
*Assistant Examiner* — Jonathan A Sparks
(74) *Attorney, Agent, or Firm* — Buchanan Ingersoll & Rooney PC (57) ABSTRACT

A method and communication system are disclosed for conducting a conference among conference participants connected by a communication system. This system has at least one conference server and at least one image reproduction unit at each conference environment. The method involves collecting context data concerning at least one of the conference participants at multiple timed intervals; calculating a relationship value from the context data at the timed intervals; determining a relationship status, wherein the relationship status is expressed using one of several categories defined by a threshold value, depending on the calculated relationship value; and displaying the relationship status on at least one image reproduction unit during the conference. The method may be performed at the beginning of the conference and/or when a new participant joins the conference.

17 Claims, 4 Drawing Sheets

(56) References Cited

U.S. PATENT DOCUMENTS

2011/0271197 A1 11/2011 Jones et al.
2013/0013667 A1* 1/2013 Serena ................. G06Q 10/10
709/203

* cited by examiner

METHOD AND DEVICE FOR MANAGING A CONFERENCE

FIELD OF INVENTION

The invention concerns a method and a device for managing a conference, in particular a virtual conference.

BACKGROUND OF THE INVENTION

Conferences are becoming ever more important in the business world. The practice already exists of holding conferences with people who are physically present in a conference room and people who are not in the conference room but rather, for example, at a job site, working from home, or located somewhere else, wherein the people who are not physically present are included via electronic means of communication. So that all conference participants can be seen appropriately, it is preferable from a social standpoint if people who know each other better can also convey that while communicating. The many social contacts that are also but not only cultivated through social networks and via digital communication media, together with increasingly busy schedules, mean that people who are not in the room are not recognized or activities in common are forgotten. This has also been described as "digital dementia." In such cases, a conference participant is treated as an outsider, which leads to irritation and can impair the conference. In addition, "experiences" that have occurred with a specific conference participant in the past can make it possible, for example, to reach a solution more rapidly if personal preferences, sensitive issues, or areas open to compromise are known. If such experiences are known for each conference participant, it can increase the productivity of a conference.

Previously it was not possible to learn about personal qualities and characteristics unless there was time to do so during the conference, or unless there was a prior conversation about who was there, where participants had previously met, and how well they knew each other. There is often no time for this, and so these possibilities are lost, especially if a participant is not physically present in the conference room. In such situations, something that could be a powerful tool for rapidly establishing an efficient and successful discussion, individual trust, or understanding often goes unused. A discussion related to this lack could drag on unnecessarily, because the participants didn't fully understand each other at first.

One goal of the present invention is to offer a method and a device for managing communications in conferences that can at least in part overcome the aforementioned disadvantages of the prior art. A particular goal of the present invention is to offer a method and a device for managing communications in conferences that can increase the efficiency and productivity of conferences.

The invention achieves this goal at least partially by means of the features in the independent claims. Advantageous embodiments and developments of the invention are provided in the dependent claims.

SUMMARY OF THE INVENTION

One embodiment of the invention proposes a method for managing a conference, in which, from the perspective of at least one participant, at least one other participant is displayed in a virtual room, wherein the method includes the following steps, to be taken at the beginning of the conference and/or when a new participant joins in and/or when initiated by one of the at least one participants:

a) Collect context data concerning each or at least one selected from among at least one other participant and/or the new participant at multiple timed intervals;
b) Calculate a relationship value from the context data at the timed intervals;
c) Determine a relationship status, wherein the relationship status is expressed using one of several categories defined by a threshold value, depending on the calculated relationship value; and
d) Display the relationship status during communication.

For purposes of this disclosure, a conference is understood to be a communication event involving multiple, preferably more than two participants, including the exchange of at least audio and video data, wherein the data exchange is accomplished using electronic means of communication, preferably governed by a packet-based protocol such as TCP/IP or the like. For purposes of the invention, a virtual room is a suitable viewing surface on a device used by at least one participant. In other words, this is called a virtual conference or teleconference. For purposes of the invention, context data are understood to be data about the participant's relationship with one or more of the other participants, as described in more detail below. For purposes of the invention, a relationship value is a numerical value used to quantify the intensity of a relationship. With each communication process that occurs between persons, the context data with reference to those persons are changed. Because the context data are reacquired at the time of the conference, the relationship status is continually updated. The current relationship status for any or all of the other participants can be displayed instantly for the at least one participant, so that known but forgotten relationships or experiences can effectively be recalled. This also makes it possible, without intensive advance preparation, to associate with each other at rated trust levels and better assess the other participant. Long "warm-up periods" can be shortened or eliminated. The productivity and efficiency of the conference can be increased. Assignment to defined categories facilitates the participants' intuitive comprehension of the relationship status.

Context data can be collected from data sources such as:
social networks;
on-house communication and staff network data banks;
connection data banks of communication providers such as e-mail, telephone, VoIP, and mobile wireless service providers.

It should be understood that this list does not include all possible sources. Widely different types of data sources, such as relationship networks, for example, can be evaluated and used in determining the relationship status.

In addition, the context data can be related to events such as:
communication events such as telephone conversations, e-mails, SMS, MMS, etc.;
friend statuses, messages, likes, comments, blog entries, etc.;
organizational events;
professional collaboration;
projects;
meetings;
joint publications or conference presentations;
joint travel or events;
mutual interests;
living or working in proximity;

membership in the same associations, societies, political parties, or other personal organizations, with the understanding that this list does not include all possible items. Widely different types of events can be evaluated and used in determining the relationship status. It is possible to call up and display context data or metadata and/or individual event content from the data sources during the conference.

Context data can be or include a counted number of events assigned to the other participant from the participant's perspective, wherein preferably the counted number of events used in calculating the relationship value is weighted according to how long before the time of the conference it happened and/or according to the type and/or circumstances of the event. This makes it possible to rate the relationship by simply adding up the communication events. As an example of weighting according to how long ago the event happened, an event that occurred longer ago can be weighted lower than a more recent event. As an example of weighting according to the type of event, a jointly organized project or joint publication can be weighted higher than a like on a social network. As an example of weighting according to the circumstances of the event, the length of telephone conversations, number of characters in selected text messages or text files, data volumes of selected files, etc. can influence the rating.

The time intervals can include a current time interval that runs up to the time of the virtual conference, and a prior time interval that immediately precedes the current time interval, wherein the length of the time intervals is one month, in particular. One month is a reasonable length of time for active relationships. For finer classification, shorter time intervals such as two weeks, one week, or one day are also conceivable. For weaker relationships, a longer time period such as a year or longer can be suitable, so as to be able to include old school friends, fellow college students, vacation acquaintances, etc. for example.

The relationship value is calculated preferably using the formula $$B(T)=V \times Z(T)+(1-V) \times B(T-1)$$

wherein T is a current time interval, T−1 is an elapsed time interval immediately before the current time interval t, Z is a counted number of events in a given time interval, V is a factor that simulates having forgotten about events over time and is expressed by a value between 0 and 1, preferably 0.4-0.8, and B is the relationship value. By introducing a memory factor, a forgetfulness curve is added. The formula essentially represents a simple digital low-pass filter. Alternatively, other filtering characteristics can also be used. As an option, statistical outliers can be smoothed out using median filtering.

In one preferred embodiment, collection of context data and preferably calculation of a relationship value from the context data are executed separately for all or for several selected or for one relationship level(s). It is especially preferred to collect context data, calculate a relationship value from the context data and determine a relationship status separately for all or for several selected or for one relationship level(s). The relationship level(s) can include:

public relationships;
private relationships;
work-related relationships;

In other words, context data are acquired for each relationship level, a relationship value is preferably also calculated for each relationship level, and, especially preferably, the relationship status is also determined for each relationship level. This means that the aforementioned method can be applied fully for each separate relationship level. In addition, it is also possible to add levels together for a total score at any point in the process, wherein, for example, a maximal value for the relationship status of all levels is used as a total score or an overall relationship status is determined based on an appropriately weighted sum of the relationship values for all levels, or a total relationship value is calculated based on an appropriately weighted sum of the context data for all levels. The display of results can include all or one or more preset or one or more selected relationship levels. In other words, for example, the at least one participant can choose whether he wishes the display to show one selected relationship level or a relationship result for all or multiple integrated relationship levels.

Again, it is understood that the list of relationship levels is not all-inclusive. For example, multiple levels can exist for work-related relationships if a participant includes multiple positions in the company. Multiple levels of private or public relationships can also be defined, such as those related to family, to professional (but not company-related) contacts, to a society, or to a political party. It is possible for each participant's relationship levels to be freely defined and configured.

The relationship status can be displayed in any of the following ways:

Audio signals;
Colors, in particular a background, a border, or fill;
Tags;
Icons, emoticons;
Images, graphics, caricatures;
Film clips, music clips, jingles.

But this list is not all-inclusive. The display choice can be such that the relationship status and the respective calculated levels "jump right out" at the viewer. Different types and/or means of display can be used for different relationship levels.

The relationship status preferably includes the categories "strong relationship," "medium relationship," "weak relationship," and "no relationship." The threshold values used to delimit the relationship statuses are set to be relevant to life experience and can be adjusted by the user as appropriate.

It is understood that the method can be performed in a communication system using a computer program that includes program commands that make a computer carry out the process steps of the described process, if the computer program is stored on or called up by the computer, as well as a software product that is stored on a computer-readable medium and can preferably be installed directly into the internal memory of a computer and has program codes for carrying out the process steps of the described method when the computer program is run on the computer, plus a digital storage medium with electrically readable control signals that can be processed by a programmable computer in order to manage communication processes, wherein the control signals are generated and adjusted so as to make the computer carry out the process steps of the described method. Such a computer can be part of a conference system, a conference server, a conference terminal, a participant's individual device, etc.

A device for executing the method is provided, wherein the process is carried out as described above. The problem addressed by the present invention is solved by these devices for the same reasons as the ones stated above for the corresponding method. The device can be, for example, a conference server or a central conference unit or terminal.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments unless this is obviously inapplicable for technical or physical reasons. Exemplary embodiments can be combined with other exemplary embodiments and that combination can also be considered an exemplary embodiment of the invention.

Present preferred embodiments of the invention are described below in more detail based on preferred exemplary embodiments and with reference to the figures.

The figures are schematic presentations and not necessarily according to scale. The illustrations in drawings and the descriptions thereof shall be considered exemplary illustrations of the principle of the invention and shall in no way restrict the invention.

DESCRIPTION OF THE PREFERRED EMBODIMENTS

The present method is intended to be performed by a communication system used for conducting a conference among conference participants, one set of conference participants being at a first conference environment and at least one other set of conference participants being at another conference environment. The conference participants are connected by a communication system that has at least one conference server and at least one image reproduction unit at each conference environment on which images corresponding to at least some of the conference participants are displayed. The image reproduction unit may be a stand alone display device such as an LED screen, a computer monitor or a screen on a mobile commuication device such as a smart phone. The conference server contains a processor and a non-transitory memory containing a program which causes the communication system to perform the method described here. The communication system may also contain a local conferencing unit at one or more of the conference environments which has a processor and a non-transitory memory that can perform some or all of the steps of the present method.

Figure 1:
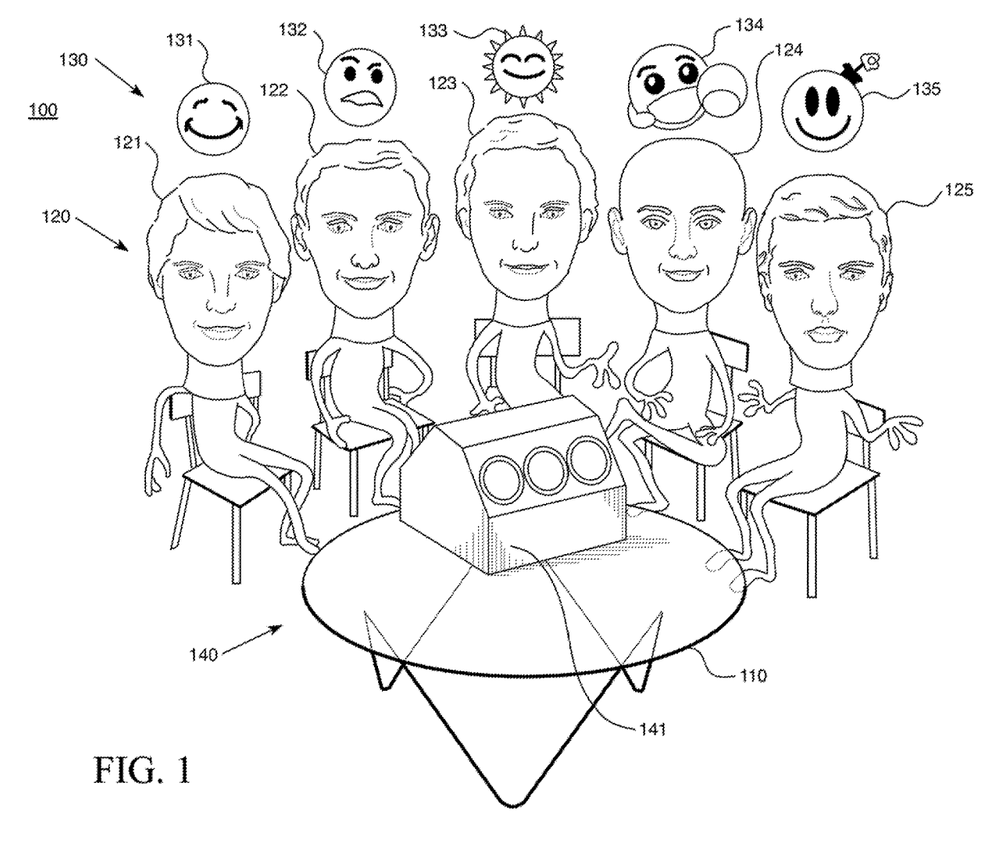
FIG. 1 is a representation of a virtual conference room from a participant's perspective.

FIG. 1 shows a representation of a virtual conference room 100 from the perspective of a participant in a video conference. In other words, the conference room 100 corresponds to an image or partial image (called a window) on a participant's display screen. The one participant who is not shown here is also designated in the following as the viewer.

The virtual conference room 100 includes a reference structure 110 that represents a conference table. Around the reference structure 110 is a group of participants 120 that includes participants 121, 122, 123, 124, and 125. In addition, around the participant group 120 there is a group of symbols 130 that includes symbols 131, 132, 133, 134, and 135, wherein each of the symbols 131, 132, 133, 134, and 135 is assigned to one of the participants 121, 122, 123, 124, and 125. Precisely stated, symbol 131 is assigned to participant 121, symbol 132 is assigned to participant 122, symbol 133 is assigned to participant 123, symbol 134 is assigned to participant 124, and symbol 135 is assigned to participant 125. The symbols 131, 132, 133, 134, and 135 are so-called emoticons that symbolize an emotional and/or relationship status for each of the participants 121, 122, 123, 124, 125. In addition, there is a group of objects 140, which here includes only a single object 141 located on the reference structure 110 (conference table). The object 141 corresponds to a file or file folder for an object that can be opened on the same or a separate display screen area by the viewer.

Figure 2A:
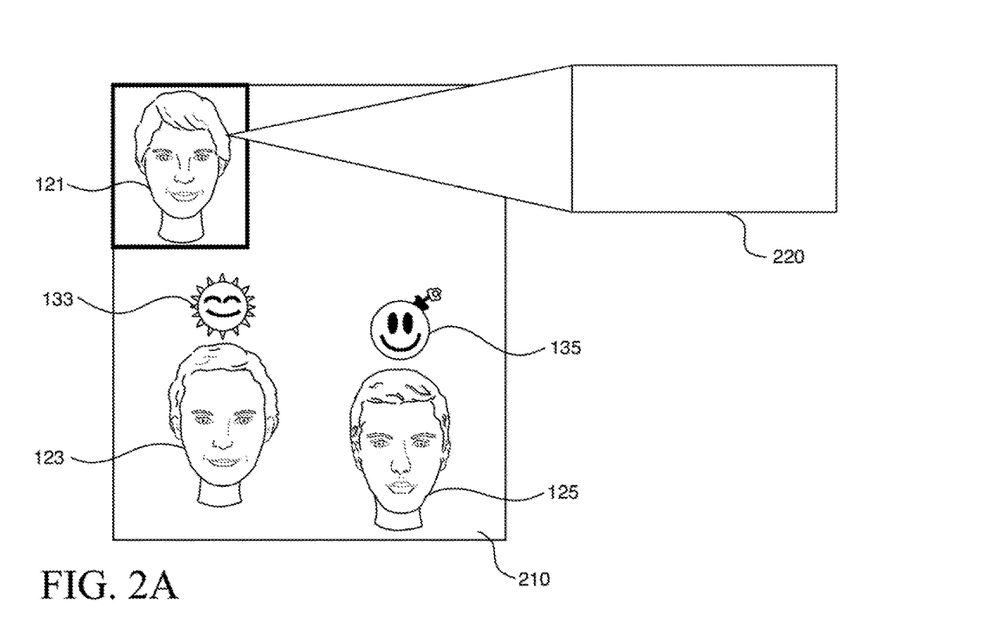
FIG. 2A is a representation of a selection of participants from the virtual conference room with additional information.
Figure 2B:
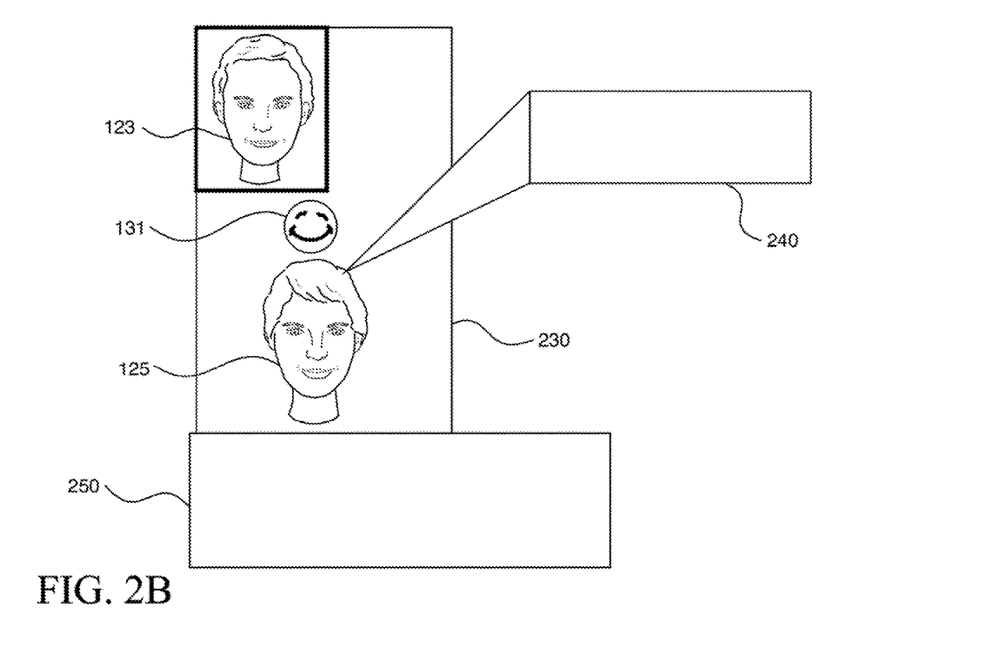
FIG. 2B is a representation of another selection of participants from the virtual conference room with additional information.

FIGS. 2A and 2B each include a representation of a selection of participants from the virtual conference room 100 with additional information. More precisely, FIG. 2A shows a selection area 210 in whose upper left corner the participant 121 from FIG. 1 is shown in accentuated form, here highlighted by a border and colored or gray background. An information block 220 is assigned to the participant 121, visually set off from the selection window 210. In addition, the selection area 210 includes the participants 123 and 125 with their respective symbols (emoticons) 133 and 135.

The information block 220 can provide specific personal information, for example, such as:
personal notes,
personal assessments,
curriculum vitae.

The selection area 210 has been generated, for example, by the viewer of the conference room 100 from FIG. 1. The selection area 210 allows the participant 121 to be accentuated after he/she is, for example, selected by the viewer or identified by the viewer's line of sight. In other words, the viewing participant him/herself can adjust the focus, or the focus can be recognized and established, for example, by facial identification using a camera at the conference location. The additional participants 123 and 125 in the selection area 210 can be, for example, participants who were previously selected or identified or were established by a conference server or similar means based on other criteria.

FIG. 2B further shows a selection area 230 in whose upper left corner the participant 123 is shown in accentuated form, here highlighted by a border and colored or gray background. An information block 235 is assigned to the participant 123, visually set off from the selection area 230. In addition, the selection area 230 includes the participant 125 with his/her symbol (emoticon) 135. An information block 250 can be seen below the selection area 230.

The information block 240 can provide specific personal information, for example, such as:
calling up recent publications,
results of the last meeting.

The information block 250 can contain individual relationship information for other conference participants as summary information. The individual relationship information is obtained from historical data. The "sentiment detection" resulting from the data analysis can recognize emotional statements. By combining these emotional statements, a sympathy sequence can be established by comparison with the values for other people with whom a relationship exists. The summarized relationship can be rated on a sympathy □ antipathy scale. This is also possible on line, where any negative statements/responses and/or positive statements/responses are evaluated using sentiment detection. The summary information in that case is the summary relationship based on the emotional values for sympathy and antipathy provided by sentiment detection.

Figure 3:
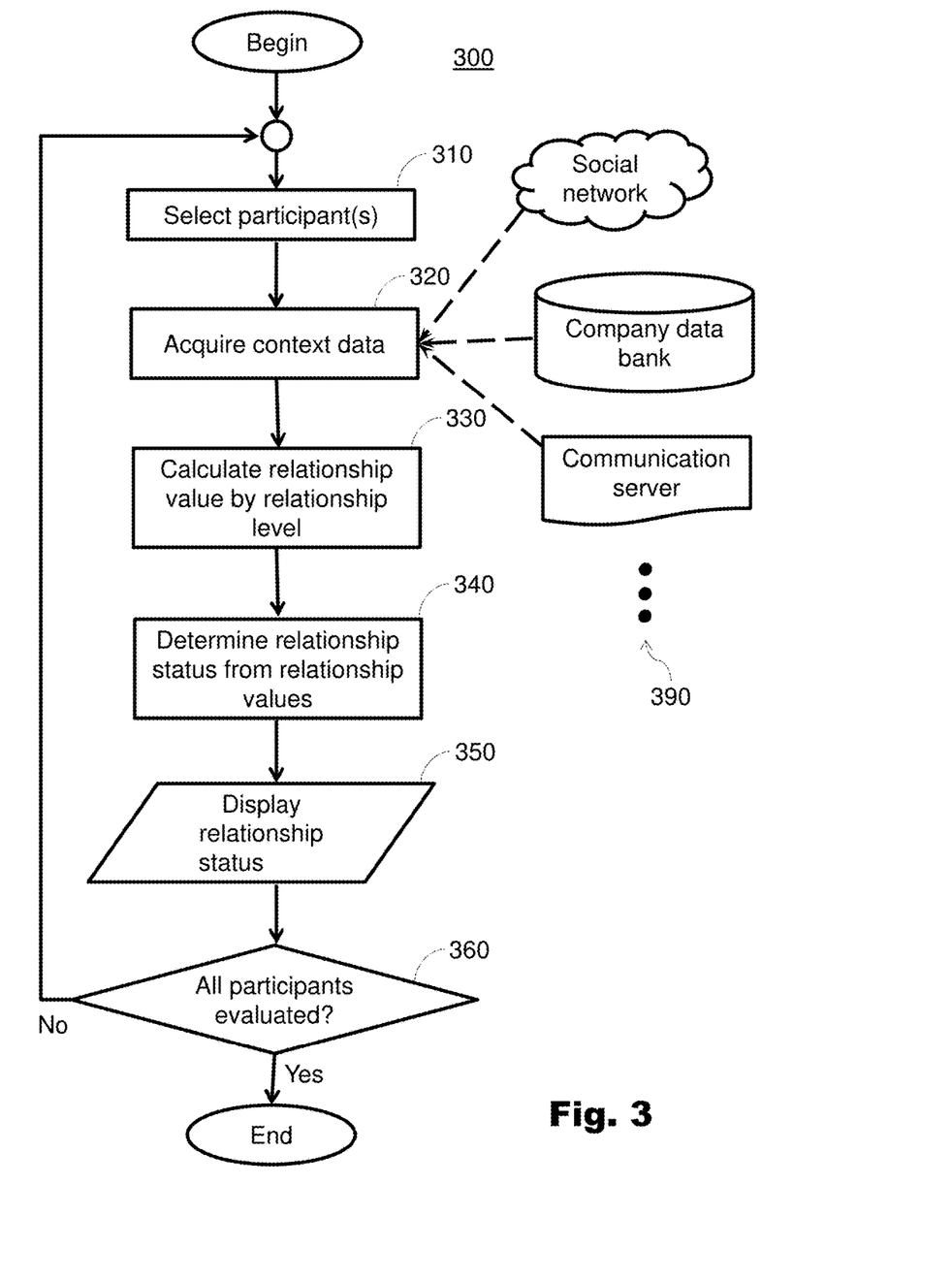
FIG. 3 is a flow diagram illustrating one communication management process.

FIG. 3 shows a communication management process 300. When the process 300 is called up, a pre-selected list from among the participants in the conference is transferred to the process 300. The pre-selected list can be generated by the viewer or by the system.

After the process is started (called up) and after a transfer step not shown here is completed, in step 310 a participant is selected from among the participants generated in the process 300.

Next, in step 320 context data are acquired for the participant selected in step 310. The context data reflect the relationship status with the selected participant on multiple relationship levels. For example, the relationship levels can include:
Private relationships (p),
Public relationships (ö),
Work-related relationships (f).

The context data are acquired from data sources 390 such as social networks, a company database, a communications server, or other sources, for example, and can refer to items such as organizational data, communication data (connection data), project data, meeting data, joint publications, etc. The relationship status generated from the context data corresponds in each level to a counted number Z of events that have occurred at the respective level.

Next, in step 330, a relationship value B is calculated for each relationship level. The relationship value B for each relationship level is generated from the events that have occurred at the respective relationship level over time. A forgetfulness curve, characterized by a forgetfulness constant V, is applied in order to give priority to more recent events. In other words, first an applicable time interval T is selected, in which the various events that have occurred are counted in order to generate a counted number Z in each time interval T. The relationship value B is then calculated using a simple digital low-pass filter. Alternatively, other filter functions can be used or, for example, statistical outliers can be filtered out with median filtering. As a suitable filter function, the function $$B(T)=V \times Z(T)+(1-V) \times B(T-1)$$

can be used. Wherein T is a current time interval, T−1 is a previous time interval immediately before the current time interval T, Z is the counted number of events in the given time interval, V is the forgetfulness factor that simulates having forgotten about events over time, and B is the relationship value.

The length of each time interval T, T−1 can be established by default as one month. However, other time intervals can also be used. It is also possible to use different time intervals for different relationship levels. It is conceivable that one month could be too short of a time period to count for weak relationships, so that possibly quarters, half-years, years, or even longer periods of time may be appropriate.

By selecting the time interval T and the forgetfulness factor V, relationships can be standardized for a particular participant. For instance, less communicative people can have strong relationships, although they generally communicate less often than others.

In the concrete example, for the three relationship levels ö, p, and f, the relationship values $$B_{ö}(T)=V \times Z_{ö}(T)+(1-V) \times B_{ö}(T-1) \text{ for the public relationship level,}$$

$$B_{p}(T)=V \times Z_{p}(T)+(1-V) \times B_{p}(T-1) \text{ for the private relationship level, and}$$

$$B_{f}(T)=V \times Z_{f}(T)+(1-V) \times B_{f}(T-1) \text{ for the company relationship level are calculated.}$$

Next, in step 340, a relationship status is determined from each relationship level, using the relationship values calculated in step 330. Here categories are used that reflect the strength of a relationship and are characterized by threshold values for each relationship value. For example, the categories "strong relationship," "medium relationship," "weak relationship," and "no relationship" are used. If the relationship value B(T) is below a threshold value $B_{weak}$, the relationship is assigned to the relationship level categorized as "no relationship." If the relationship value B(T) is above the threshold value $B_{weak}$ but below the threshold value $B_{medium}$, the relationship is assigned to the relationship level categorized as "weak relationship." If the relationship value B(T) is above the threshold value $B_{medium}$ but below the threshold value $B_{strong}$, the relationship is assigned to the relationship level categorized as "medium relationship." If the relationship value B(T) is above the threshold value $B_{strong}$, the relationship is assigned to the relationship level categorized as "strong relationship."

The relationship status for the defined participant is then displayed in step 350.

The subsequent step 360 determines whether all or all selected participants have been evaluated. If so (yes in step 360), the process 300 ends. Otherwise (no in step 360), the process jumps back to the aforementioned transfer step that leads back to step 310.

The process 300 can be performed by a central conference unit. Alternatively, the process 300 can also be performed by an individual conference participant's device or system.

Since the relationship value B(T) in each relationship level ö, p, f can be recalculated based on how long ago each event occurred, including the event numbers Z per relationship level for the current time interval T as well as the relationship B for the last time interval T−1, the current relationship value can be recalculated at any time. In so doing, only relationship values that are above the threshold value $B_{weak}$ can be used for a weak relationship.

Obviously, the invention is not limited to the three levels listed. For example, the private level can be separated into a personal and a professional level, there can be multiple company-related relationship levels for different companies, there can be political or association-related levels, etc. Event counting can be weighted depending on the source. It is therefore conceivable for long-term projects with comparatively few communication events to be weighted higher than postings to a social network, SMSs, etc.

Figure 4:
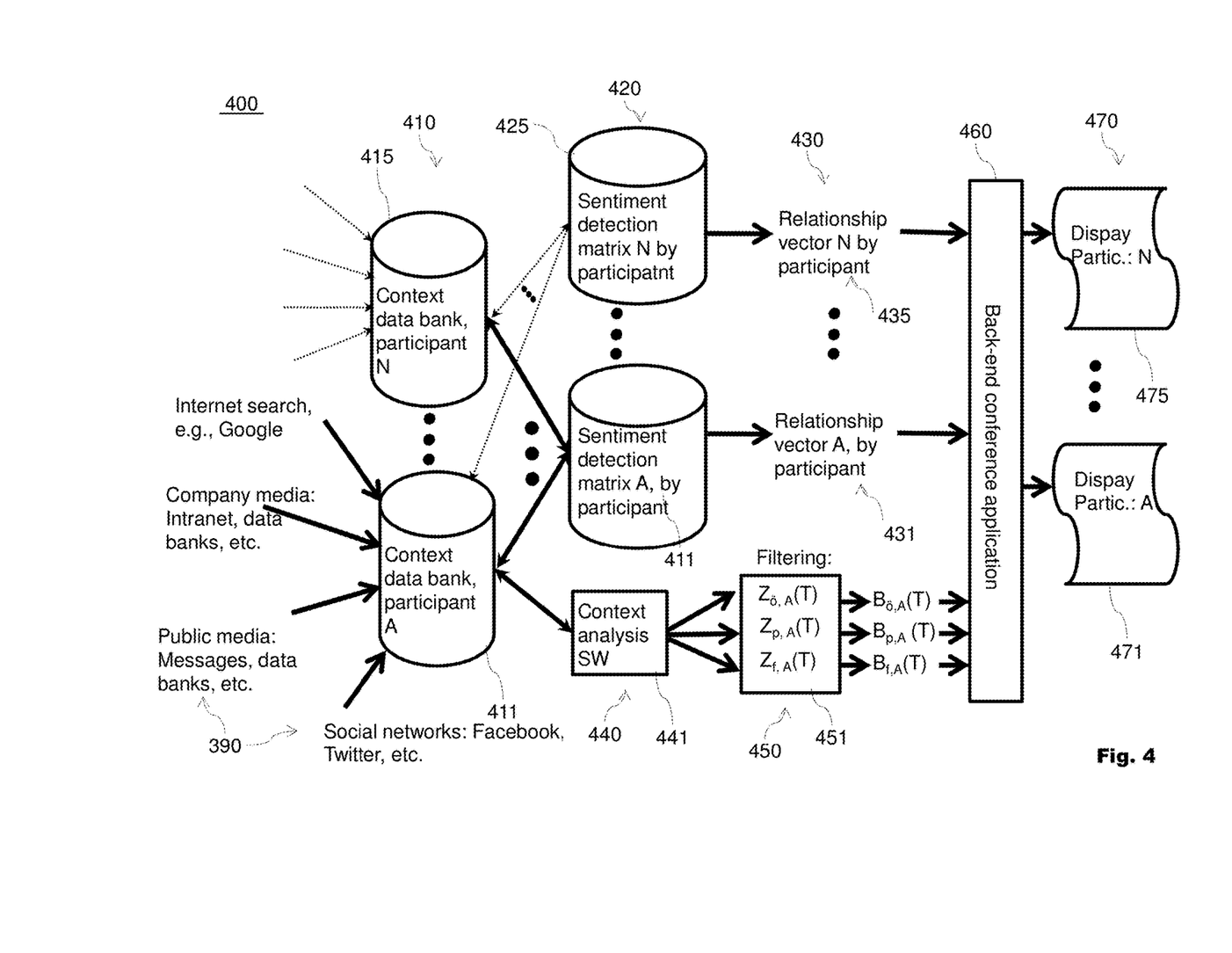
FIG. 4 is a block diagram illustrating process steps with references to hardware and software components from the process shown in FIG. 3.

FIG. 4 shows a block diagram that illustrates process steps related to hardware and software components of a communication system or conference system that executes the process from FIG. 3. It is assumed that multiple participants A, . . . , N are participating in a conference. The participants 121, 122, 123, 124, and 125 from FIG. 1 can be the participants A, . . . , N from FIG. 4.

In a first process step and/or context data step 410, a context data bank is provided for each participant A, ..., N. The figure shows a first context data bank 411 for the participant A and an nth context data bank 415 for the participant N. When process paths for the participants A and N are described below as coming from the context data banks 411 and 415, the statement should be understood as also referring to the other participants and related context data banks, etc. The context data banks 411, ..., 415 are generated such that context data for the participants A, ..., N are collected from data sources 390. For example, data sources 390 can be:

Social networks such as Facebook, Twitter, etc.
Public media such as news stories, databases, etc.,
Company media such as Intranet, databases, etc.,
Internet searches, for example on Google, etc.,
and others.

In a second process step and/or sentiment detection step 420, a sentiment detection matrix is provided for each participant A, ..., N, of which a first sentiment detection matrix 421 for the participant A and an nth sentiment detection matrix 425 for the participant N are shown. Each of the sentiment detection matrices 421, ..., 425 is generated such that the context data bases 411, ..., 415 are accessed for all participants, so that sentiment detection is performed for each participant A, ..., N with respect to every other participant A, ..., N.

In a third process step and/or relationship step 430, for each participant A, ..., N a relationship vector is provided for each (other) participant, of which a first relationship vector 431 for the participant A and an nth relationship vector 435 for the participant N are shown. The relationship vectors 431, ..., 435 are acquired from the respective sentiment detection matrices 421, ..., 425, wherein the relationship vector 431 represents the relationships of the participant A with all participants A, ..., N, and an nth relationship vector 435 represents the relationships of the participant N with all participants A, ..., N. A participant's relationship with him/herself can be represented in the respective relationship vector as a "0" or "−1" or another characteristic value, or can be omitted. The relationship vectors are sent to a back-end conference application 460 which will be described later.

There, separately from the previously described sentiment detection, context analysis is performed in a fourth process step and/or context analysis step 440. In the illustrated case, context analysis is performed only for the participant A. Therefore, in the context analysis step 440, only a single context analysis unit 441 is shown, which performs a context analysis for the participant A based on the context data stored in the context data bank 411. The context analysis includes counting events for each relationship level ö, p, and f (see above).

For each of the relationship levels ö, p, f (see above), the context analysis results in counted event numbers Z(T) in the preset time interval T, i.e., a counted event number $Z_{ö,A}(T)$ for the public relationship level of the participant A, a counted event number $Z_{p,A}(T)$ for the private relationship level of the participant A, and a counted event number $Z_{f,A}(T)$ for the company relationship level of the participant A.

The counted event numbers Z(T) are delivered to a fifth process step and/or filtering step 450. The filtering step 450 includes a filter unit 451 for the participant A. The filter unit 451 applies a filtering function in order to calculate and categorize, based on the counted event numbers for each of the relationship levels ö, p, f, a relationship value B(T) in the preset time interval T, i.e., a relationship value $B_{ö,A}(T)$ for the public relationship level of the participant A, a relationship value $B_{p,A}(T)$ for the private relationship level of the participant A, and a relationship value $B_{f,A}(T)$ for the company relationship level of the participant A (no, weak, medium, or strong relationship, see above), so that this calculation can also be sent to the related conference application 460.

In the following conference application 460, all relationship vectors 431, ..., 435 as well as all relationship values $B_{ö/p/f,A}(T)$ are processed so that the participants' representations can be displayed on a screen or similar device in a final process step or display step 470. In the display step 470, displays are generated for each participant A, ..., N, of which a first display 471 for the participant A and an nth display 475 for the participant N are shown. The displays for the participants correspond, for example, to the displays shown in FIGS. 1, 2A, and 2B.

It should be noted that using the processes in the upper process branch, consisting of process steps 420 and 430, determines the emotional qualities of the relationships between participants, while using the processes in the lower process branch, consisting of process steps 450 and 460, determines the intensity of the relationships between participants. Therefore, in the display step 470 a two-dimensional differentiation of the relationship with respect to relationship quality and relationship intensity is achieved using the emoticons 131-135 in the symbol group.

The description above is from the perspective of one viewer of the virtual conference room 100 in FIG. 1. If the virtual conference room 100 is available to multiple conference participants, it is possible (under potentially sensitive circumstances) for the relationship statuses of certain participants to be available only to certain participants on their individual devices, such as the selection windows 210, 230 of FIGS. 2A, 2B, while other participants' access to those relationship statuses is blocked.

In summary, the present method is based on the assumption that, in this era of extremely full schedules, there is usually no time to prepare adequately in advance for a conference. In particular, for conferences with participants in other locations, participants are not always recognized, so that prior social relationships cannot be optimally used. In order to help fill the memory gaps, it is advantageous to expand the central conference unit. According to the invention, the conference unit acquires relationship data from social networks, in-house organizational data, communication, project, and meeting data, etc. There can be essentially three relationship levels (private, company, public), each of which can be divided into four categories (strong, medium, weak, none). Per level, an overall relationship is determined as a counted value within a defined period of time (month, year). From that, a filter function is used to calculate the relationship value, which falls into one of four categories. The filter function defines a forgetfulness curve using a forgetfulness constant. By selecting the time period and the forgetfulness constant, a relationship can be adapted to the characteristics of a person. Grouping into a category is done by comparison with a threshold value. Depending upon the capabilities of the device, the result can be linked to the person and displayed in the form of audio signals, icons, colors, emoticons, etc. The invention can calculate and display the status of a (personal) relationship with reference to an "aging process," among other things. This relationship status can also be used to manage additional functions (prioritizing information, interrupting a conference, forwarding to a distributor).

The features of the invention described with reference to the illustrated embodiments, for example the information block 220 in FIG. 2A that contains specific personal information such as personal notes, personal assessments, and/or curriculum vitae, can also exist in other embodiments of the invention, for example additionally or alternatively in the information block 240 with call-ups of recent publications and/or the results of the last conversation in FIG. 2B, except when stated otherwise or when impossible for technical reasons.

LIST OF REFERENCE SIGNS AND SYMBOLS

100 virtual conference room
110 Reference structure (conference table)
120 Group of participants
121-125 Participants in a conference
130 Group of symbols
131-135 Symbols for the participants 121-125
140 Group of objects
141 Object
210 Selection area (selection window)
220 Information block
230 Selection area
240 Information block
250 Information block
300 Process
310-360 Process steps
390 Data sources
410 Process step (context data step)
411, 415 Context data banks
420 Process step (sentiment detection step)
421, 425 Sentiment detection matrix
430 Process step (relationship value step)
431, 435 Relationship vectors
440 Process step (context analysis step)
441 Context analysis unit
450 Process step (filtering step)
451 Filter unit
460 Back-end conference application
470 Process step (display step)
471, 475 Display
f Company level
ö Public level
p Private level
B Relationship value
T Time interval (current)
T−1 Time interval (previous)
V Forgetfulness vector
Z Event number
The list above is an integral component of the description.

What is claimed is:

1. A method for conducting a conference among conference participants via a communication system, one set of conference participants being at a first conference environment, at least one other set of conference participants being at another conference environment, the conference participants being communicatively connected by the communication system, the communication system comprising at least one conference server having a processor and non-transitory memory and at least one image reproduction unit at each conference environment on which images corresponding to at least some of the conference participants are displayed, wherein the method comprises:
   a) the communication system collecting context data concerning at least one of the conference participants at multiple timed intervals from multiple sources of the context data, the multiple sources comprising social network sources and public media sources accessible via at least one network connection the communication system has with these sources;
   b) the communication system calculating a relationship values from the collected context data at the timed intervals for different relationship levels;
   c) the communication system determining at least one relationship status based on the calculated relationship values for the different relationship levels, wherein the relationship status is expressed using one of several categories that are each defined by a threshold value, depending on the calculated relationship value; and
   d) displaying the at least one relationship status on at least one image reproduction unit during the conference;
   wherein each relationship value is calculated according to the formula:

$$B(T)=V \times Z(T)+(1-V) \times B(T-1)$$

wherein T is a current time interval, T−1 is a prior time interval that immediately precedes the current time interval, Z is a counted number of events in a respective time interval, V is a factor that simulates having forgotten about events over time and is expressed by a value between 0 and 1, and B is the relationship value.

2. The method as in claim 1 wherein the context data are collected from data sources selected from the group consisting of social networks, in-house communications, staff network data banks, and connection data banks of communication providers.

3. The method as in claim 2 wherein the communication providers are e-mail service providers, telephone service providers, VoIP service providers or mobile wireless service providers.

4. The method as in claim 1 wherein the context data represent events selected from the group consisting of communication events, friend statuses, messages, likes, comments, blog entries, organizational events, professional collaboration, projects, meetings, joint publications, conference presentations, joint travel, joint events, mutual interests, living in proximity, working in proximity, membership in an association, membership in a society, political party affiliation, membership in a civic organization, and membership in a cultural organization.

5. The method as in claim 4 wherein the communication events are telephone conversations, e-mails, SMS messages or MMS messages.

6. The method as in claim 1 wherein the context data includes a counted number of events assigned to a selected participant and wherein the counted number of events used in calculating the relationship value is weighted according to at least one of how long before the conference the events happened, type of event and circumstances of the event.

7. The method as in claim 1 wherein the time intervals include a current time interval that runs up to a time of the conference, and a prior time interval that immediately precedes the current time interval, wherein each of the time intervals is one month.

8. The method of claim 1 wherein V has a value of 0.4 to 0.8.

9. The method of claim 1 wherein there is only one relationship status that is determined based on all the relationship levels.

10. The method of claim 1 wherein the relationship levels comprise: public relationships, private relationships and professional relationships.

11. The method of claim 1 wherein the relationship status is displayed by one of audio signals, background color, a border, tags, icons, emoticons, images, graphics, caricatures, film clips, music clips and jingles.

12. The method as in claim 9 wherein the relationship status is selected from the group of categories consisting of strong relationship, medium relationship, weak relationship, and no relationship.

13. The method of claim 1 wherein steps a) through c) are performed at the beginning of the conference.

14. The method of claim 1 wherein steps a) through c) are performed when a new participant joins the conference.

15. A communication system connecting a plurality of conference environments comprised of at least one conference server and at least one image reproduction unit at each conference environment on which images corresponding to at least some conference participants are displayed, the at least one conference server containing a processor and a non-transitory memory containing a program which causes the communication system to:
  a) collecting context data concerning at least one of the conference participants at multiple timed intervals from multiple sources of the context data, the multiple sources comprising social network sources and public media sources accessible via at least one network connection the communication system has with these sources;
  b) calculating relationship values from the collected context data at the timed intervals for different relationship levels;
  c) determining at least one relationship status based on the calculated relationship values for the different relationship levels, wherein the at least one relationship status is expressed using at least one of several categories that are each defined by a threshold value, depending on the calculated relationship value; and
  d) displaying the at least one relationship status on at least one image reproduction unit during the conference; and
  wherein the communication system also includes a local conferencing unit connected to the at least one conference server and which is assigned to the respective conference environment; and wherein each relationship value is calculated according to the formula:

$$B(T)=V \times Z(T)+(1-V) \times B(T-1);$$

where T is a current time interval, T−1 is a prior time interval that immediately precedes the current time interval, Z is a counted number of events in a respective time interval, V is a factor that simulates having forgotten about events over time and is expressed by a value between 0 and 1, and B is the relationship value.

16. A non-transitory computer readable medium having a program defining a method that is executable by a processor of a conference server in a communication system for conducting a conference among sets of conference participants, one set of conference participants being at a first conference environment, at least one other set of conference participants being at another conference environment, the conference participants being connected by the communication system, the communication system comprised of the conference server and at least one image reproduction unit at each conference environment on which images corresponding to at least some of the conference participants are displayed, wherein the method comprises:
  a) collecting context data concerning at least one of the conference participants at multiple timed intervals from multiple sources of the context data, the multiple sources comprising social network sources and public media sources accessible via at least one network connection the communication system has with these sources;
  b) calculating relationship values from the collected context data at the timed intervals for different relationship levels;
  c) determining at least one relationship status, wherein the at least one relationship status based on the calculated relationship values for the different relationship levels, each relationship status being expressed using one of several categories that are each defined by a threshold value, depending on the calculated relationship value; and
  d) displaying the at least one relationship status on at least one image reproduction unit during the conference; and
  wherein each relationship value is calculated according to the formula:

$$B(T)=V \times Z(T)+(1-V) \times B(T-1),$$

wherein T is a current time interval, T−1 is a prior time interval that immediately precedes the current time interval, Z is a counted number of events in a respective time interval, V is a factor that simulates having forgotten about events over time and is expressed by a value between 0 and 1, and B is the relationship value.

17. The non-transitory computer readable medium of claim 16 wherein V has a value of 0.4 to 0.8.

* * * * *